US010167842B2

(12) United States Patent
Dölerud et al.

(10) Patent No.: US 10,167,842 B2
(45) Date of Patent: Jan. 1, 2019

(54) METHOD FOR CONTROLLING THE OPERATION OF A SUBMERSIBLE POWER PLANT

(71) Applicant: MINESTO AB, Västra Frölunda (SE)

(72) Inventors: Erik Dölerud, Göteborg (SE); Arne Quappen, Göteborg (SE); Christian Norinder, Göteborg (SE); Mattias Andersson, Göteborg (SE)

(73) Assignee: MINESTO AB, Västra Frölunda (SE)

( * ) Notice: Subject to any disclaimer, the term of this patent is extended or adjusted under 35 U.S.C. 154(b) by 120 days.

(21) Appl. No.: 15/506,671

(22) PCT Filed: Aug. 29, 2014

(86) PCT No.: PCT/SE2014/050996
§ 371 (c)(1),
(2) Date: Feb. 24, 2017

(87) PCT Pub. No.: WO2016/032382
PCT Pub. Date: Mar. 3, 2016

(65) Prior Publication Data
US 2017/0276116 A1 Sep. 28, 2017

(51) Int. Cl.
| *F03B 13/10* | (2006.01) |
| *F03B 17/06* | (2006.01) |
| *F03B 13/26* | (2006.01) |

(52) U.S. Cl.
CPC ............ *F03B 13/10* (2013.01); *F03B 13/264* (2013.01); *F03B 17/06* (2013.01); *F05B 2240/97* (2013.01);
(Continued)

(58) Field of Classification Search
CPC ........ F03B 13/10; F03B 13/264; F03B 17/06; F03B 2240/97
See application file for complete search history.

(56) References Cited

U.S. PATENT DOCUMENTS

| 6,091,161 A | 7/2000 | Dehlsen et al. |
| 6,923,622 B1 | 8/2005 | Dehlsen |

(Continued)

FOREIGN PATENT DOCUMENTS

| CN | 101379291 A | 3/2009 |
| CN | 102748201 A | 10/2012 |

(Continued)

OTHER PUBLICATIONS

PCT International Search Report PCT/SE2014/050996, dated Mar. 7, 2015 (6 pages).

(Continued)

*Primary Examiner* — Jonathan Matthias
(74) *Attorney, Agent, or Firm* — Morrison & Foerster LLP (57) ABSTRACT

The invention relates to a method for controlling the operation of a submersible power plant (1) and a submersible power plant (1). The submersible power plant (1) comprises a structure (2) and a vehicle (3). The vehicle (3) comprises at least one wing (4). The vehicle (3) is arranged to be secured to the structure (2) by means of at least one tether (5). The vehicle (3) is arranged to move in a predetermined trajectory by means of a fluid stream passing the vehicle (3). The vehicle (3) is arranged to change the angle of attack of the at least one wing (4). The method comprises: I: determining if the speed of the fluid passing the vehicle (3) is higher than a predetermined value; or II: determining if the speed of the fluid passing the vehicle (3) is lower than the predetermined value. The vehicle (3) changes the angle of attack for different situations depending on if the speed is higher or lower than the predetermined trajectory.

18 Claims, 8 Drawing Sheets

(52) U.S. Cl.
CPC ....... *F05B 2260/70* (2013.01); *F05B 2270/11* (2013.01); *Y02E 10/28* (2013.01)

(56) References Cited

U.S. PATENT DOCUMENTS

| | | |
|---|---|---|
| 7,291,936 B1 | 11/2007 | Robson |
| 2012/0104763 A1 | 5/2012 | Lind |

FOREIGN PATENT DOCUMENTS

| | | | |
|---|---|---|---|
| EP | 1816345 | A1 | 8/2007 |
| JP | 2002-535188 | A | 10/2002 |
| JP | 2009-525427 | A | 7/2009 |
| JP | 2010-531956 | A | 9/2010 |
| WO | 2009004420 | A2 | 1/2009 |
| WO | 2011091448 | A2 | 7/2011 |
| WO | 2011091448 | A3 | 7/2011 |
| WO | 2014/063258 | A1 | 5/2014 |
| WO | 2014/092625 | A1 | 6/2014 |
| WO | 2014120058 | A1 | 8/2014 |

OTHER PUBLICATIONS

PCT International Preliminary Report on Patentability PCT/SE2014/050996, dated Nov. 23, 2016 (13 pages).
International Search Report and Written Opinion Received for PCT Application No. PCT/SE2014/050996, dated Jul. 3, 2015, 18 pages.
Invitation to Pay Additional Fee received for PCT Patent Application No. PCT/SE2014/050996, dated May 29, 2015, 5 pages.
Extended European Search Report (includes Supplementary European Search Report and Search Opinion) received for European Patent Application No. 14900568.8, dated Mar. 28, 2018, 5 pages.
Office Action received for Japanese Patent Application No. 2017-511756, dated Jun. 18, 2018, 3 pages (English Translation Only).
Intention to Grant received for European Patent Application No. 14900568.8, dated Aug. 22, 2018, 8 pages.
Office Action received for Chinese Patent Application No. 201480081586,7, dated Jun. 20, 2018, 11 pages (6 pages of English Translation and 5 pages of Official Copy).

METHOD FOR CONTROLLING THE OPERATION OF A SUBMERSIBLE POWER PLANT

CROSS REFERENCE TO RELATED APPLICATIONS

This application is a U.S. National Phase patent application of PCT/SE2014/050996, filed Aug. 29, 2014, the disclosure of which is hereby incorporated by reference in the present disclosure in its entirety.

TECHNICAL FIELD

Method for controlling the operation of a submersible power plant, the submersible power plant comprising a structure and a vehicle, the vehicle comprising at least one wing, the vehicle being arranged to be secured to the structure by means of at least one tether; the vehicle being arranged to move in a predetermined trajectory by means of a fluid stream passing the vehicle.

BACKGROUND ART

Submersible power plants are known in the art. One kind of submersible power plants uses a vehicle comprising a wing. The vehicle is arranged to be secured to the structure by means of a tether and is arranged to move in a predetermined trajectory by means of a fluid stream passing the vehicle. The control of the vehicle depends on input from sensors which provide information on various parameters needed to control the vehicle. This is described in EP 1816345.

One application for a submersible power plant is the production of electricity from a fluid stream, such as a tidal stream, by allowing the energy of a fluid stream to be converted to electrical energy by for instance a turbine and generator being placed on the vehicle.

The use of a tidal stream for producing electricity gives rise to a number of situations wherein the vehicle needs to be controlled in order to be able to start and stop the vehicle during normal operation and to be able to control start and stop of the vehicle to avoid damage to the vehicle. Further, it is desirable to optimise the power output of the power plant during normal operation.

There thus exists a need for an improved method and power plant for controlling the operation of a submersible power plant in various vehicle states.

SUMMARY OF THE INVENTION

One object of the present invention is to provide an inventive method for controlling the operation of a submersible power plant and a submersible power plant where the previously mentioned problems are at least partly avoided. This object is achieved by the features of the characterising portion of claims 1 and 8. Variations of the invention are described in the appended dependent claims.

The submersible power plant comprises a structure and a vehicle. The vehicle comprises at least one wing. The vehicle is arranged to be secured to the structure by means of at least one tether. The vehicle is arranged to move in a predetermined trajectory by means of a fluid stream passing the vehicle.

The invention is characterized in that the vehicle is arranged to change the angle of attack of the at least one wing, and in that the method comprises:

I: determining if the speed of the fluid passing the vehicle is higher than a predetermined value,
  if the speed of the fluid passing the vehicle is higher than the predetermined value,
  Ia: starting the vehicle by adjusting the angle of attack of the at least one wing to reach operation depth of the vehicle, and initiate movement of the vehicle in a predetermined trajectory starting power generation, or;
  Ib: controlling the speed of the vehicle during power generation by adjusting the angle of attack of the at least one wing to optimize power output, or;
  Ic: stopping the vehicle by adjusting the angle of attack of the at least one wing such that the lift exerted on the wing by the fluid passing the vehicle is essentially zero or;
II: determining if the speed of the fluid passing the vehicle is lower than the predetermined value,
  if the speed of the fluid passing the vehicle is lower than the predetermined value,
  IIa: adjusting the angle of attack of the at least one wing to move to and/or keep the vehicle in a position that enables the vehicle to start when the speed of the fluid passing the vehicle is determined to be higher than the predetermined value.

By that the method allows for adjusting the angle of attack in response to if the speed of the fluid passing the wing is higher or lower than a predetermined value, thereby the vehicle of the submersible plant can be controlled for a multitude of various situations.

It is for instance desirable to be able to start the vehicle and initiate movement in a predetermined trajectory from the surface to initiate power production. This situation occurs for instance during installation or after service of the vehicle.

It is also desirable to be able to start the vehicle and initiate movement in a predetermined trajectory from a position below the surface to initiate power production. This situation occurs if the vehicle has been stopped for any reason while being below the surface and when the reason for the vehicle being stopped does not call for the vehicle to be removed from operation.

With the lift being essentially zero is meant a lift which is less than or equal to the drag forces affecting the vehicle. It is also desirable to be able to control the speed of the vehicle while the vehicle is in operation during its movement over the predetermined trajectory. The angle of attack for the vehicle during its movement over the predetermined trajectory can be optimized in order for the power output from the turbine and generator to increase. This is done by that the vehicle's mean speed over the predetermined trajectory is increased. It is also desirable to stop the vehicle during operation if a malfunction occurs that would endanger the vehicle or other parts of the submersible plant.

When the speed of the fluid passing over the wing is lower than a predetermined value, the lift of the wing is not high enough to allow for operation of the vehicle. In this situation it is desirable to be able to move the vehicle, by changing the angle of attack, to a position that enables the vehicle to start when the speed of the fluid passing the vehicle is determined to be higher than the predetermined value and keep it there as long as the speed of the fluid is low. If the vehicle already is in a suitable position, it is desirable to keep the vehicle in that position. With position is meant depth and direction of the vehicle.

The speed of the fluid can be determined by measuring a physical property by using a direct or indirect connection between the physical property and the speed of the fluid passing over the wing. Physical properties that can be measured are for instance the speed of the fluid itself, either at a position away from the vehicle or at a position on the vehicle, the tether load, the turbine speed, the pressure for determining the change of the vehicle's height in the predetermined trajectory or angular sensors for measuring the angular speed of the tether and/or the kite itself. These physical properties allows for calculation of the speed of kite and thereby the speed of the fluid by means of that a control unit is programmed either with a mathematical relationship between the physical property and the speed of the vehicle or a look-up table, database or similar of measured values which can be used to calculate the speed of the vehicle from measured values. Preferably, once the vehicle has started moving in the predetermined trajectory the speed of the vehicle is used to optimize power output.

To determine the speed of the fluid passing the vehicle and the position of the vehicle many different types of sensors can be used.

If the speed of the fluid passing the vehicle is higher than the predetermined value and the vehicle is moving in a predetermined trajectory, the method may also comprise:

III: determining if the vehicle is in danger of colliding with an object traversing the predetermined trajectory,
  if the vehicle is determined to be in danger of colliding with an object traversing the predetermined trajectory,
  IIIa: stopping the vehicle by adjusting the angle of attack of the at least one wing such that the lift exerted by the fluid passing the vehicle is essentially zero,
  IIIb: determining that the object traversing the predetermined trajectory has left the predetermined trajectory,
  IIIc: upon determining that the object traversing the predetermined trajectory has left the predetermined trajectory, adjust the angle of attack of the at least wing to initiate movement of the vehicle in the predetermined trajectory starting power generation.

If an object or an animal comes in the path of the predetermined trajectory, it is important that no collisions occur which may damage the vehicle, the object or the animal. By adjusting the angle of attack such that the lift exerted by the fluid on the wing is essentially zero, the method allows for this to be minimized or avoided completely. The presence of an object approaching a predetermined trajectory where a vehicle is moving is for instance done by sonar, visual detection means such as cameras connected to an image detection system or a proximity sensor. When stopped the angle of attack may be adjusted to move to and/or keep the vehicle in a position that enables the vehicle to start when the object traversing the predetermined trajectory is determined to have left the predetermined trajectory. When the speed of the fluid passing the vehicle is determined to be higher than the predetermined value the vehicle can start and resume power generation.

If the speed of the fluid passing the vehicle is higher than the predetermined value, the method may also comprise:

IV: determining if the vehicle has lost power,
  if the vehicle has lost power,
  IVa: stopping the vehicle by adjusting the angle of attack of the at least one wing such that the lift exerted by the fluid passing the vehicle is essentially zero,
  IVb: determining that power has been restored to the vehicle,
  IVc: upon determining that power has been restored to the vehicle, adjust the angle of attack of the at least wing to initiate movement of the vehicle in the predetermined trajectory starting power generation.

In case power is lost to the vehicle it is necessary to ensure that the vehicle does not get damaged, crashes into any other object or into the bottom of a sea, lake or the ocean. In order to avoid this, when power is lost to the vehicle an electromechanical fail-safe ensures that the angle of attack is changed such that the vehicle immediately upon power loss experiences no lift and thereby remains stationary in the water. After power is restored the vehicle can restart its movement by changing the angle of attack such that the lift experienced by the wing starts the movement of the vehicle. It is also possible for the vehicle to move to a position that enables the vehicle to start if the position after power loss is unsuitable for starting the vehicle.

Method according to any one of the preceding claims, wherein, when controlling the speed of the vehicle during power generation, the tether load is controlled by adjusting the angle of attack of the at least one wing. When optimizing the power output, it is necessary to control the tether load during high speed currents in order to ensure that the tether does not break. This is done by changing the angle of attack such that the lift is reduced. The tether load can be measured by a sensor attached to the tether.

The method can be performed in a number of ways.

In one embodiment of the invention, the angle of attack of the vehicle is changed by means of a pitch control system where the pitch control system is arranged to extend or retract a rear strut of the vehicle. The pitch control system is attached to the rear strut which in turn is attached to the tether. The pitch control system in this embodiment comprises a motor, wherein the motor also comprises a brake and a transmission comprising at least one gear. A spiral-shaped drum is attached to an axis to which a clutch is attached. The clutch transfers power to the axis when it is engaged with the transmission and enables the drum to disengage from the transmission, leading to that the drum can spin freely when the angle of attack needs to be changed quickly. On the drum a pliable connection means is wound which in turn is connected to the rear strut.

In one embodiment of the invention, the angle of attack of the vehicle is changed by means of a pitch control system where the pitch control system is arranged to change the attachment position of the strut along the length of a nacelle attached to the wing or along the length of the wing. The pitch control system in this embodiment comprises a movable attachment means for the rear strut.

In one embodiment of the invention, the angle of attack of the vehicle is changed by means of a pitch control system, wherein the pitch control system comprises an elevator.

The invention also relates to a submersible power plant comprising a structure and a vehicle. The vehicle comprises at least one wing. The vehicle is arranged to be secured to the structure by means of at least one tether. The vehicle is arranged to move in a predetermined trajectory by means of a fluid stream passing the vehicle. The power plant further comprises a control unit and at least one sensor unit. The vehicle is arranged to change the angle of attack of the at least one wing. The angle of attack of the at least one wing is arranged to be changed by the control unit upon inputs from the at least one sensor unit. The control unit is arranged to determine if the speed of the fluid passing the vehicle is higher or lower than a predetermined value based on inputs from the at least one sensor unit.

A submersible power plant according to the invention allows for performing the method as described above. The submersible power plant is equipped with at least one sensor providing sensor input to a control unit. Based on the inputs from the sensor the control unit determines if the speed of the fluid passing the vehicle is higher or lower than a predetermined value and changes the angle of attack depending on the situation the vehicle is in.

In one embodiment of the invention the angle of attack of the vehicle is changed by means of a pitch control system being arranged to extend or retract a rear strut of the vehicle. The rear strut is attached to the tether and the pitch control system.

In one embodiment of the invention, the vehicle comprises a nacelle comprising the pitch control system. The nacelle is attached to the wing and to the rear strut, where the rear strut is arranged to be attached to the pitch control system in the nacelle such that the rear strut can be extended and retracted by the pitch control system.

In one embodiment of the invention, the pitch control system is integrated in the wing. The rear strut is arranged to be attached to the pitch control system in the wing such that the rear strut can be extended and retracted by the pitch control system.

In the embodiments where the pitch control system is integrated in the nacelle or the wing, the rear strut may be attached to the pitch control system by a pliable connection means. Preferably, the pliable connection means is one of a rope, cable, cord, string or wire. It is preferable for the pliable connection means to have a small or zero elongation under stress. The pliable connection means are preferably made from Dyneema® although other materials exhibiting small or zero elongation under stress are also conceivable.

The rear strut can be rigid or pliable and has a hydrodynamic cross-section. The force member in the rear strut is preferably made from Dyneema®.

In the embodiments where the nacelle comprises the pitch control system or where the pitch control system is integrated in the wing, the pitch control system comprises a clutch, transmission, motor and brake. The pitch control system may additionally comprise a spiral-shaped drum for storing the pliable connection means and a guide means for guiding the pliable connection means during extension and retraction of the pliable connection means.

In the embodiments where the nacelle comprises the pitch control system or where the pitch control system is integrated in the wing, the pitch control system is powered in an operating state. The rear strut automatically fully extends when power to the pitch control system is lost. This has the advantage that the vehicle stops when power is lost.

In an embodiment of the invention, the angle of attack of the vehicle is changed by means of a pitch control system being arranged to change the attachment position of the strut along the length of a nacelle attached to the wing or the length of the wing.

In another embodiment of the invention, the angle of attack of the vehicle is changed by means of a pitch control system, wherein the pitch control system comprises an elevator. It is possible to combine the elevator with another one of the pitch control systems described above.

The sensor unit is one or more of: a speed sensor for direct measuring of the speed of the fluid, a tether load sensor, a turbine speed sensor, a pressure sensor or angular sensor. The angle of attack is for instance measured by a sensor for measuring the extended length of the pliable connection means or a sensor for directly measuring the angle of attack being mounted on the front struts.

The invention further relates to a computer-readable medium for use with a submersible power plant having computer executable instructions for performing the method as described above.

BRIEF DESCRIPTION OF THE DRAWINGS

FIG. 1 schematically shows a perspective view of a submersible power plant according to the invention, FIG. 2 schematically shows a side view of a submersible power plant according to the invention, FIGS. 3a-3b schematically describes a pitch control system according to the invention, FIGS. 4a-4d schematically describes a first example of an application of changing the angle of attack of the vehicle, FIG. 5 schematically describes a second example of an application of changing the angle of attack of the vehicle, FIGS. 6a-6b schematically describes a third example of an application of changing the angle of attack of the vehicle, FIG. 7 schematically shows a fourth example of an application of changing the angle of attack of the vehicle.

DETAILED DESCRIPTION

Figure 1:
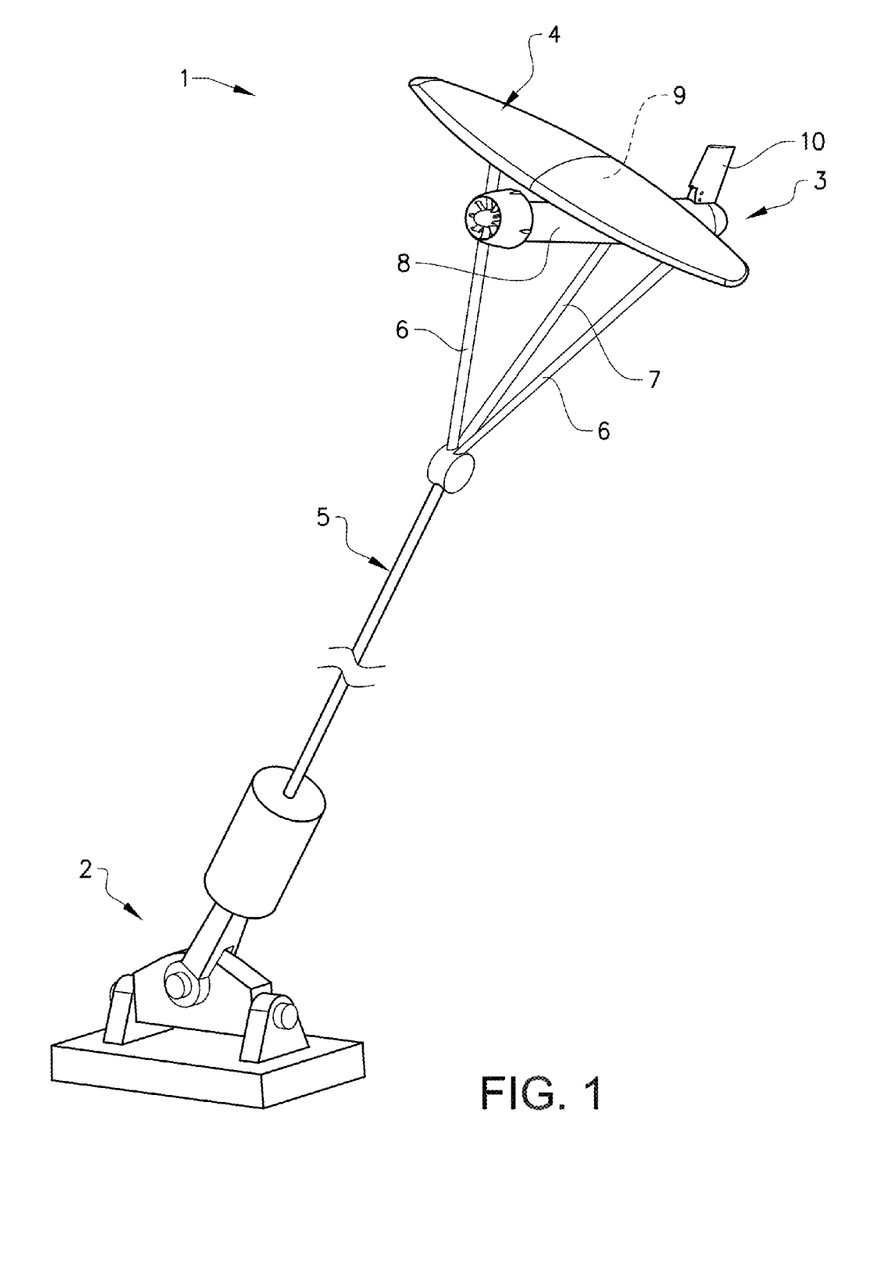

FIG. 1 schematically describes a submersible power plant 1 according to the invention. The power plant 1 comprises a structure 2 and a vehicle 3. The vehicle 3 comprises at least one wing 4. The vehicle 3 is arranged to be secured to the structure 2 by means of at least one tether 5. The vehicle 3 is arranged to move in a predetermined trajectory by means of a fluid stream passing the vehicle 3. The vehicle 3 further comprises front struts 6 and a rear strut 7. The vehicle 3 may comprise a nacelle 8 which is attached to the wing 4. The nacelle 8 may be positioned below or above the wing 4 and is attached to the wing 4 by means of a pylon 9. The vehicle 3 further comprises control surfaces in the form of a vertical rudder 10. The front struts 6 are attached to the wing 4 and the rear strut 7 is attached to the nacelle 8.

Figure 2:
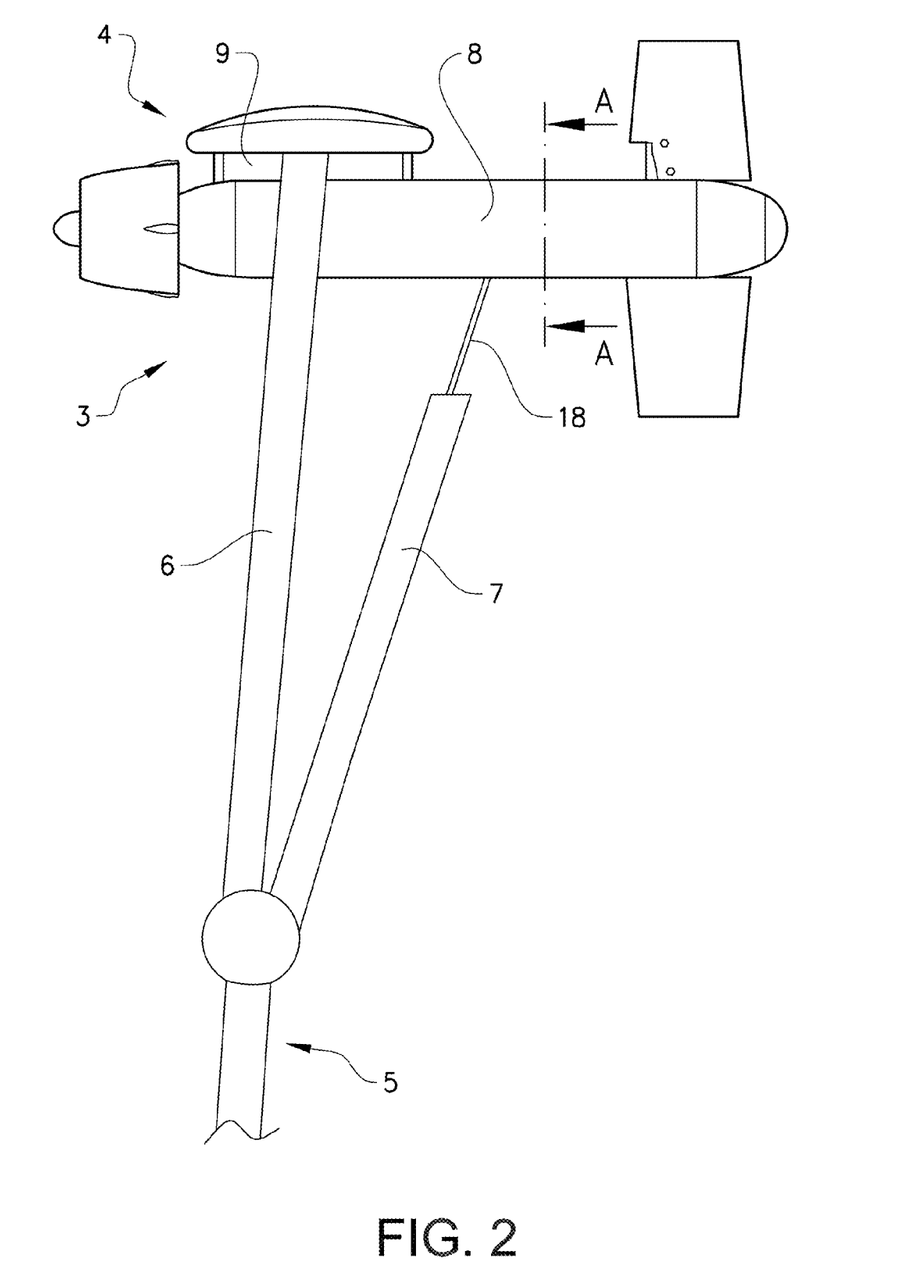

FIG. 2 schematically shows a side view of a vehicle 3 of a submersible plant according to the invention. The nacelle 8 comprises a pitch control system (not shown) to which the rear strut 7 is attached. The rear strut 7 is connected to the pitch control system via a pliable connection means 18 such as a rope, cable, cord, string or wire. Alternatively, the pliable connection means 18 is the end of the rear strut 7 itself. The pliable connection means 18 enters the nacelle via an opening (not shown) in the nacelle 8. The length of the pliable connection means 18 in FIG. 2 is merely intended for illustrative purposes.

Figure 3A:
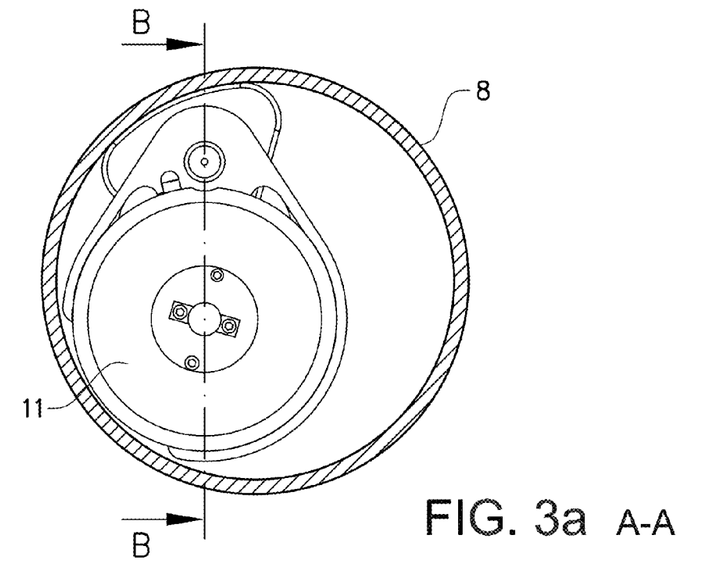
Figure 3B:
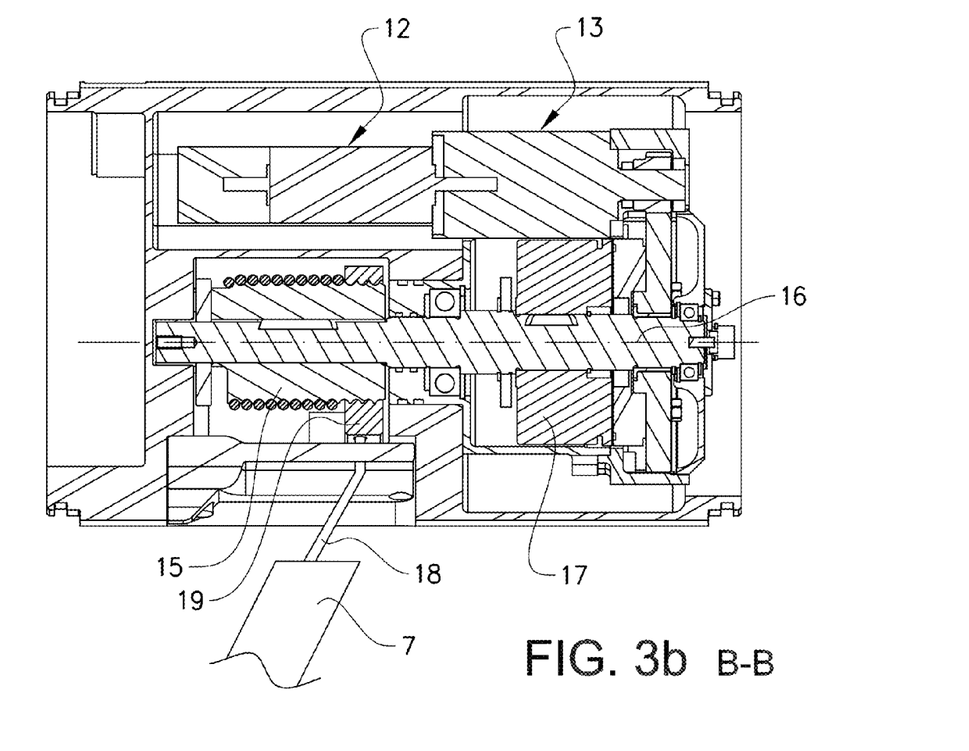

FIGS. 3a and 3b schematically describe a pitch control system 11 according to the invention. FIG. 3a is a cross section view of the nacelle 8 along line A-A of FIG. 2. The pitch control system 11 is preferably located in the rear half of the nacelle 8, the exact position of the pitch control system 11 is a design factor. In the figure, the pitch control system 11 is located off centre of a vertical centre line of the nacelle 8. The location of the pitch control system enables the opening in which the pliable connection means enters the nacelle 8, to be located at the bottom and along the longitudinal centre line of the nacelle. This enables the rear strut to be attached in along the longitudinal centre line of the nacelle. This ensures that the vehicle remains stable.

FIG. 3b schematically shows a section of the nacelle and pitch control system 11 taken along the line B-B of FIG. 3a. The pitch control system 11 comprises a motor 12, wherein the motor 12 also comprises a brake and a transmission 13 comprising at least one gear. A spiral-shaped drum 15 is attached to an axis 16 to which a clutch 17 is attached. The clutch 17 transfers power to the axis 16 when it is engaged with the transmission 13 and enables the drum 15 to disengage from the transmission, leading to that the drum 15 can spin freely when the angle of attack needs to be changed quickly. On the drum 15 a pliable connection means 18 is wound which in turn is connected to the rear strut 7. Alternatively, the end of the rear strut 7 comprises the pliable connection means 18. A guide means 19 aids in winding the pliable connection means 18 evenly on the drum 15. The motor 12 is controlled by means of a control system.

FIGS. 4a-7 all schematically show examples of applications of changing the angle of attack of a vehicle 3 of a submersible power plant 1. The arrows in the figures illustrate the direction of the tidal current. The depth at which the power plant is installed is merely an illustration and is not intended to be restrictive.

Figure 4A:
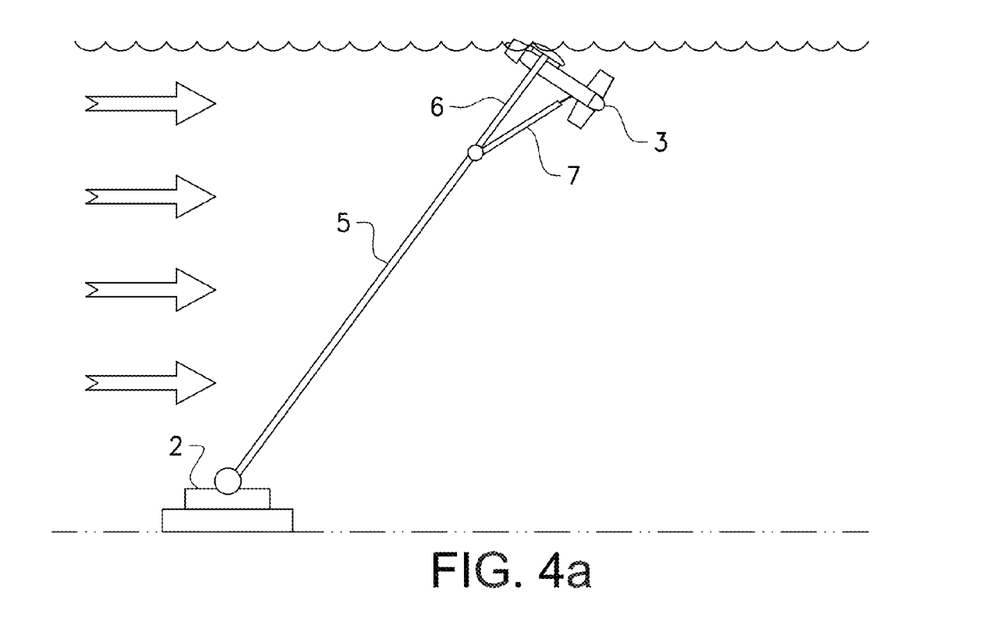

FIGS. 4a-4d schematically describes a first example of an application of changing the angle of attack of the vehicle 3. In FIG. 4a the vehicle 3 is situated at the surface. This situation occurs for example when the vehicle 3 is being put into use for the first time or is being put to use after service. The vehicle 3 is placed at the surface where it finds an upright, stable position, using the pitch control system, with the front of the vehicle 3 facing towards the current direction (indicated in the figures by arrows). With an upright, stable position is meant a position in which the vehicle 3 is oriented with the wing 3 above the nacelle 8. In an alternative configuration, an upright, stable position is a position in which the vehicle 3 is oriented with the wing 3 below the nacelle 8. The pitch control system is in the latter case preferably integrated in the wing 3.

Figure 4B:
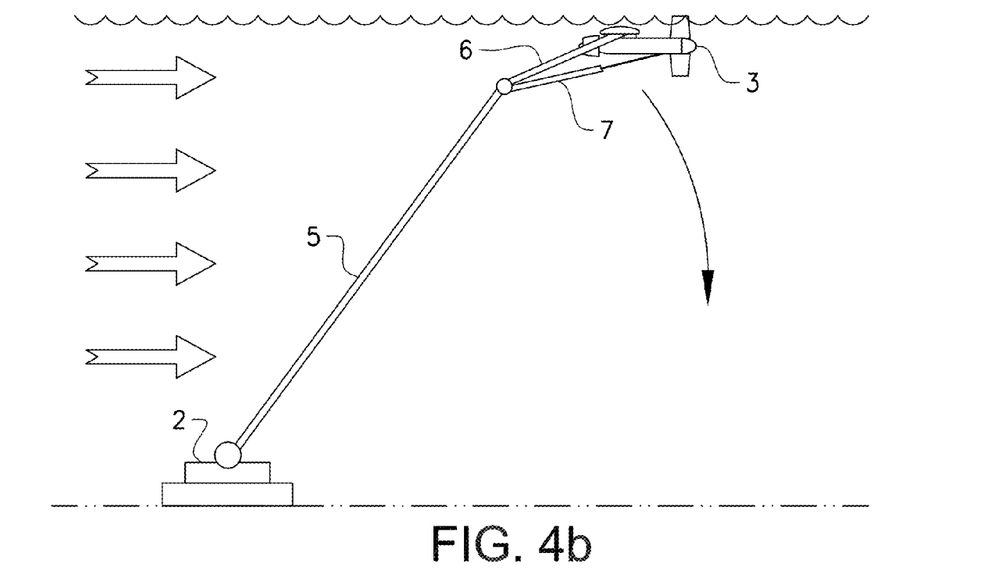

In FIG. 4b the rear strut 7 is fully extended in order for the vehicle 3 to change the angle of attack of the wing 4 and start descending.

Figure 4C:
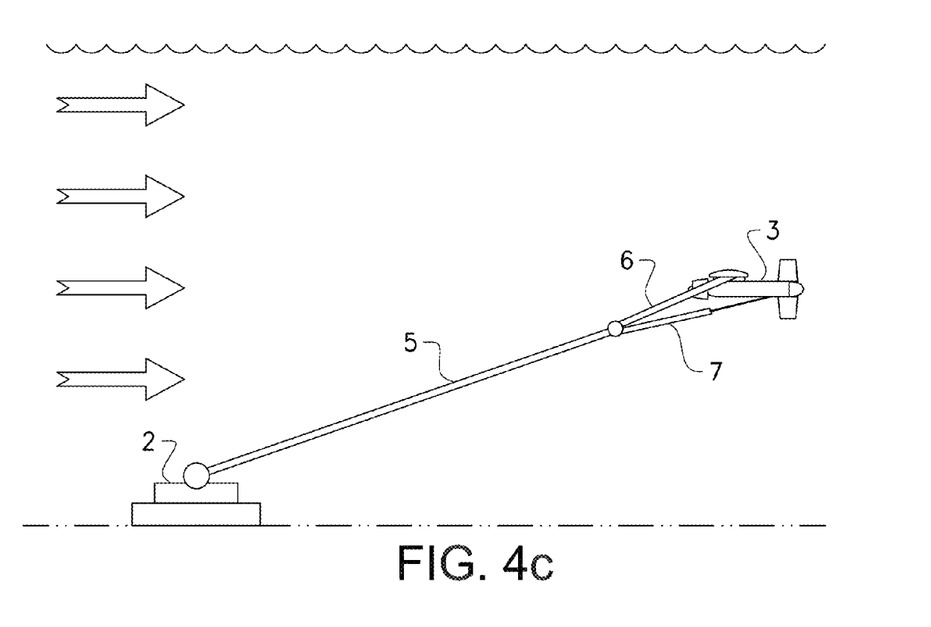

In FIG. 4c the vehicle 3 has descended to a desired depth. The lift of the wing 4 is essentially zero. The front struts 6 are able to rotate to a predetermined degree. The pitch control system controls the angle of attack which determines the depth to which the vehicle 3 will descend, enabling the vehicle 3 to start when the speed of the fluid passing the vehicle 3 is determined to be higher than the predetermined value.

Figure 4D:
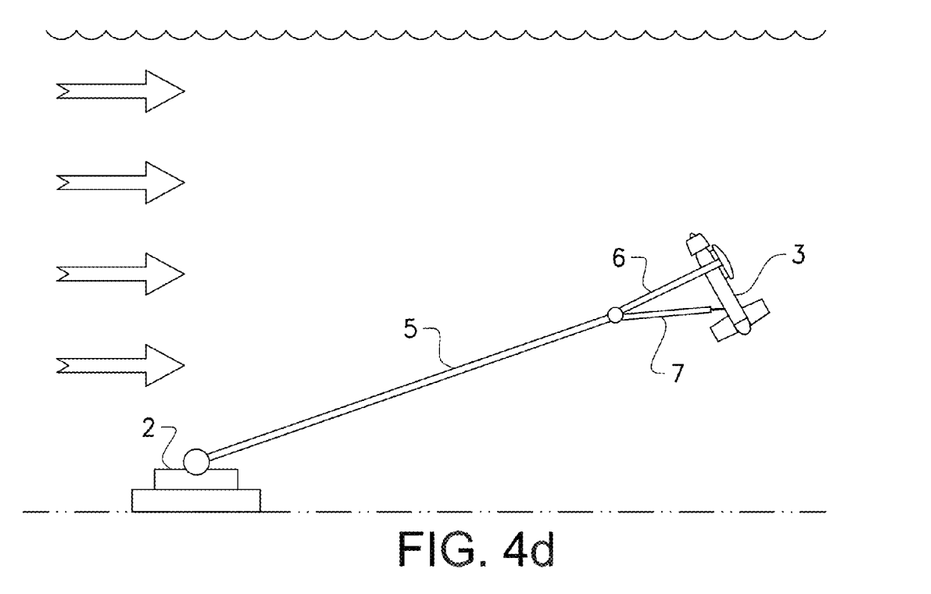

In FIG. 4d the rear strut 7 is retracted and the angle of attack is changed in order for the vehicle 3 to start moving. As the vehicle 3 is facing towards the current direction the vehicle 3 will start moving upwards and can be steered into its predetermined trajectory.

Figure 5:
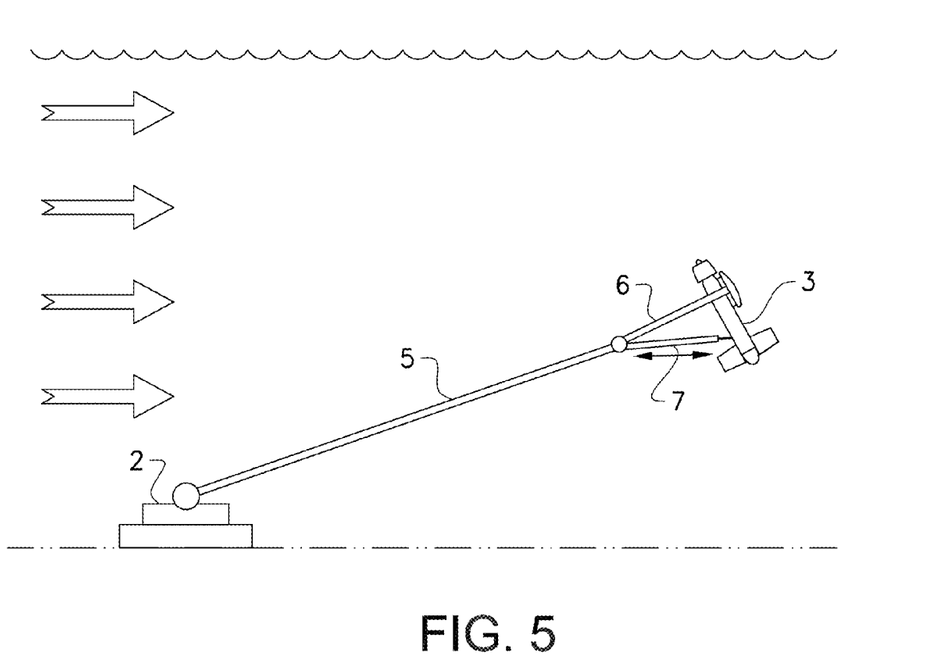

FIG. 5 schematically describes a second example of an application of changing the angle of attack of the vehicle 3. In FIG. 5 the vehicle 3 is moving along its predetermined trajectory, producing power. The length of the rear strut 7 can be changed in order to change the angle of attack and thereby change the speed over the length of the predetermined trajectory. In first positions along the predetermined trajectory where the angle of attack is lower than an optimal angle of attack for the first position, the rear strut 7 is retracted. In second positions along the predetermined trajectory where the angle of attack is higher than an optimal angle of attack for the second positions, the rear strut 7 is extended.

Figure 6A:
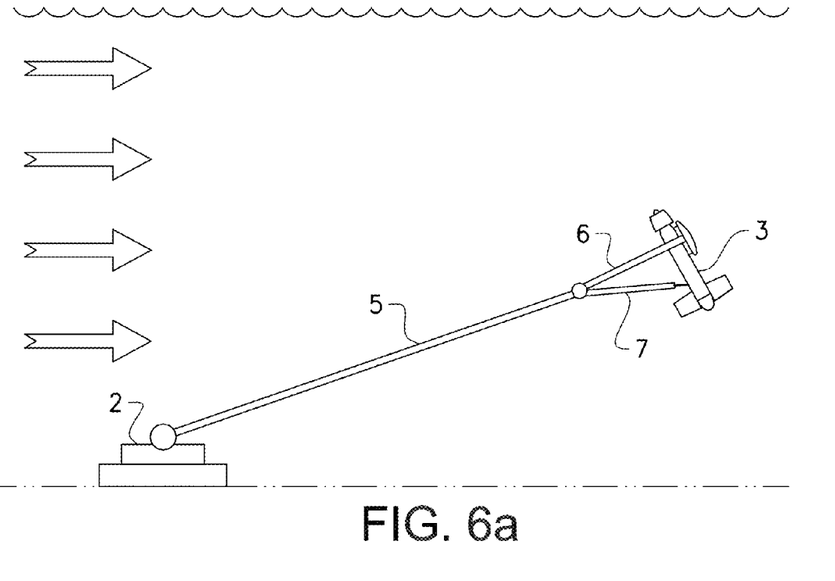
Figure 6B:
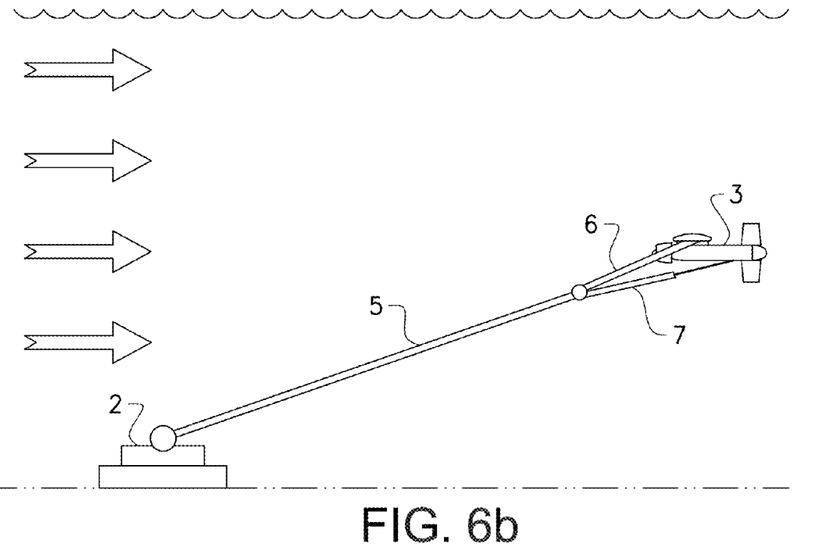

FIGS. 6a-6b schematically describes a third example of an application of changing the angle of attack of the vehicle 3. In FIG. 6a the vehicle 3 is moving along its predetermined trajectory producing power. During power production it is determined that the vehicle 3 is in danger of colliding with an object traversing the predetermined trajectory or that the vehicle 3 has lost power.

In response to either of these situations the rear strut 7 is fully extended in order to change the angle of attack such that the lift exerted by the fluid passing the vehicle 3 is essentially zero, effectively stopping the vehicle 3 from continuing to move along the predetermined trajectory. This is shown in FIG. 6b. After the object is determined to be away from the predetermined trajectory or that power has been restored, the rear strut 7 is retracted as is described in conjunction with FIG. 4d.

Figure 7:
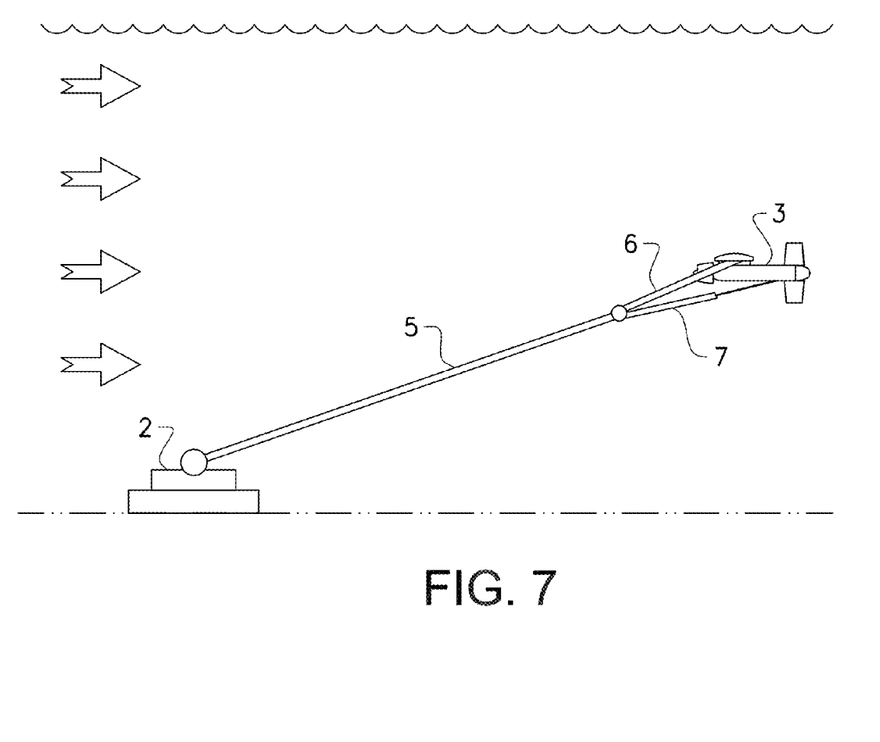

FIG. 7 schematically shows a fourth example of an application of changing the angle of attack of the vehicle 3. In FIG. 6 it is determined that the speed of the fluid passing the wing 4 is less than a predetermined value. The lower speed is illustrated by the shorter arrows in the figure. Once this is determined the rear strut 7 completely extends and the vehicle 3 is kept at a certain depth by means of the pitch control. If necessary small changes in the angle of attack can be made in order for the vehicle 3 to change its depth such that it avoids deviating from a position that enables the vehicle 3 to start when the speed of the fluid passing the vehicle 3 is determined to be higher than the predetermined value.

In the above description the nacelle 8 is positioned below the wing 4 and the rear strut 7 is attached to the nacelle 8. It is also possible for the nacelle 8 to be positioned above the wing 4. In such case the rear strut 7 is connected either to the nacelle 8 or to a wing of the vehicle 3. In case the rear strut 7 is attached to the wing the pitch control system is located in the wing. Further, the angle of attack of the vehicle 3 in FIGS. 4a-7 is merely illustrative and is not intended to be restrictive.

Reference signs mentioned in the claims should not be seen as limiting the extent of the matter protected by the claims, and their sole function is to make the claims easier to understand.

As will be realised, the invention is capable of modification in various obvious respects, all without departing from the scope of the appended claims. Accordingly, the drawings and the description thereto are to be regarded as illustrative in nature, and not restrictive.

The invention claimed is:

1. A method for controlling operation of a submersible power plant, the submersible power plant comprising a structure and a vehicle, the vehicle comprising at least one wing, the vehicle being arranged to be secured to the structure by means of at least one tether; the vehicle being arranged to move in a predetermined trajectory by means of a fluid stream passing the vehicle, wherein the vehicle comprises a pitch control system being arranged to change an angle of attack of the at least one wing, the method comprising:
   determining if a speed of the fluid passing the vehicle is higher than a predetermined value,
   if the speed of the fluid passing the vehicle is higher than the predetermined value,
Ia: starting the vehicle by adjusting the angle of attack of the at least one wing to reach operation depth of the vehicle, and initiate movement of the vehicle in a predetermined trajectory starting power generation, and;
Ib: controlling the speed of the vehicle during power generation by adjusting the angle of attack of the at least one wing to optimize power output, and;
Ic: stopping the vehicle by adjusting the angle of attack of the at least one wing such that a lift exerted on the wing by the fluid passing the vehicle is essentially zero, and
   determining if the vehicle has lost power,
   if the vehicle has lost power,
IVa: stopping the vehicle by adjusting the angle of attack of the at least one wing such that the lift exerted by the fluid passing the vehicle is essentially zero,
IVb: determining that power has been restored to the vehicle, IVc: upon determining that power has been restored to the vehicle, adjusting the angle of attack of the at least wing to initiate movement of the vehicle in the predetermined trajectory starting power generation, and;
if the speed of the fluid passing the vehicle is lower than the predetermined value,
IIa: adjusting the angle of attack of the at least one wing to move to and/or to keep the vehicle in a position that enables the vehicle to start when the speed of the fluid passing the vehicle is determined to be higher than the predetermined value.

2. The method according to claim 1, wherein, if the speed of the fluid passing the vehicle is higher than the predetermined value and the vehicle is moving in a predetermined trajectory, the method comprises:
   III: determining if the vehicle is in danger of colliding with an object traversing the predetermined trajectory, if the vehicle is determined to be in danger of colliding with an object traversing the predetermined trajectory,
   IIIa: stopping the vehicle by adjusting the angle of attack of the at least one wing such that the lift exerted by the fluid passing the vehicle is essentially zero,
   IIIb: determining that the object traversing the predetermined trajectory has left the predetermined trajectory,
   IIIc: upon determining that the object traversing the predetermined trajectory has left the predetermined trajectory, adjust the angle of attack of the at least one wing to initiate movement of the vehicle in the predetermined trajectory starting power generation.

3. The method according to claim 1, wherein, when controlling the speed of the vehicle during power generation, the tether load is controlled by adjusting the angle of attack of the at least one wing.

4. The method according to claim 1, wherein the angle of attack of the vehicle is changed by means of a pitch control system being arranged to extend or retract a rear strut of the vehicle, wherein the pitch control system is attached to the rear strut, which in turn is attached to the tether.

5. The method according to claim 1, wherein the angle of attack of the vehicle is changed by means of a pitch control system being arranged to change the attachment position of the strut along the length of a nacelle attached to the wing or the length of the wing.

6. The method according to claim 1, wherein the angle of attack of the vehicle is changed by means of a pitch control system, wherein the pitch control system comprises an elevator.

7. A submersible power plant, comprising:
a structure and a vehicle, the vehicle comprising at least one wing, the vehicle being arranged to be secured to the structure by means of at least one tether; the vehicle being arranged to move in a predetermined trajectory by means of a fluid stream passing the vehicle;
a control unit; and
a sensor unit,
wherein the vehicle comprises a pitch control system comprised in the nacelle or integrated in the wing, the pitch control system being connected to a rear strut, the pitch control system changes an angle of attack of the at least one wing according to the method of claim 1, the angle of attack of the at least one wing is arranged to be changed by the control unit upon inputs from the sensor unit,
the control unit is arranged to determine if the speed of the fluid passing the vehicle is higher or lower than a predetermined value based on inputs from the sensor unit, and
the pitch control system is powered in an operating state, such that the rear strut, automatically fully extends when power to the pitch control system is lost.

8. The submersive power plant according to claim 7, wherein the angle of attack of the vehicle is changed by means of the pitch control system being arranged to extend or retract the rear strut of the vehicle, wherein the pitch control system is attached to the rear strut, which in turn is attached to the tether.

9. The submersive power plant according to claim 8, wherein the vehicle comprises a nacelle comprising the pitch control system, the nacelle being attached to the wing, wherein the rear strut is arranged to be attached to the pitch control system in the nacelle such that the rear strut can be extended and retracted by the pitch control system.

10. The submersive power plant according to claim 8, wherein the pitch control system is integrated in the wing, wherein the rear strut is arranged to be attached to the pitch control system in the wing such that the rear strut can be extended and retracted by the pitch control system.

11. The submersive power plant according to claim 7, wherein the rear strut is attached to the pitch control system by a pliable connection means.

12. The submersive power plant according to claim 11, wherein the pliable connection means is one of a rope, cable, cord, string or wire.

13. The submersive power plant according to claim 11, wherein the pitch control system comprises a spiral-shaped drum for storing the pliable connection means and a guide means for guiding the pliable connection means during extension and retraction of the pliable connection means.

14. The submersive power plant according to claim 7, wherein the rear strut has a hydrodynamic cross-section.

15. The submersive power plant according to claim 7, wherein the pitch control system comprises a clutch, transmission, motor and brake.

16. The submersive plant according to claim 7, wherein the angle of attack of the vehicle is changed by means of a pitch control system being arranged to change the attachment position of the strut along the length of a nacelle attached to the wing or the length of the wing.

17. The submersive power plant according to claim 7, wherein the angle of attack of the vehicle is changed by means of a pitch control system, wherein the pitch control system comprises an elevator.

18. A nontransitory computer-readable medium for use with a submersible power plant having computer executable instructions for performing the method of claim 1.

* * * * *

UNITED STATES PATENT AND TRADEMARK OFFICE
CERTIFICATE OF CORRECTION

PATENT NO. : 10,167,842 B2
APPLICATION NO. : 15/506671
DATED : January 1, 2019
INVENTOR(S) : Erik Dölerud et al.

Page 1 of 2

It is certified that error appears in the above-identified patent and that said Letters Patent is hereby corrected as shown below:

In the Claims

At Column 10, Claim number 8, Line number 14, please replace:
"The submersive power plant"
With:
-- The submersible power plant --

At Column 10, Claim number 9, Line number 20, please replace:
"The submersive power plant"
With:
-- The submersible power plant --

At Column 10, Claim number 10, Line number 26, please replace:
"The submersive power plant"
With:
-- The submersible power plant --

At Column 10, Claim number 11, Line number 31, please replace:
"The submersive power plant"
With:
-- The submersible power plant --

At Column 10, Claim number 12, Line number 34, please replace:
"The submersive power plant"
With:
-- The submersible power plant --

At Column 10, Claim number 13, Line number 38, please replace:
"The submersive power plant"

Signed and Sealed this
Eighth Day of October, 2019

Andrei Iancu
*Director of the United States Patent and Trademark Office*

CERTIFICATE OF CORRECTION (continued)
U.S. Pat. No. 10,167,842 B2

With:
-- The submersible power plant --

At Column 10, Claim number 14, Line number 42, please replace:
"The submersive power plant"
With:
-- The submersible power plant --

At Column 10, Claim number 15, Line number 44, please replace:
"The submersive power plant"
With:
-- The submersible power plant --

At Column 10, Claim number 16, Line number 46, please replace:
"The submersive power plant"
With:
-- The submersible power plant --

At Column 10, Claim number 17, Line number 52, please replace:
"The submersive power plant"
With:
-- The submersible power plant --